Figure 1:
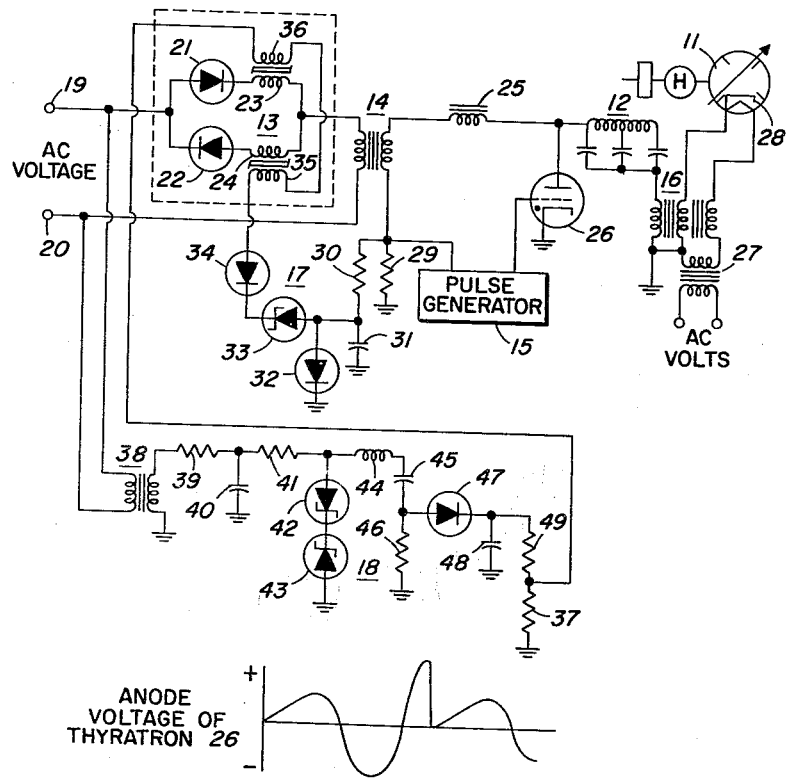

March 5, 1963  P. M. CUNNINGHAM ET AL  3,080,518
CONSTANT MAGNETRON CURRENT REGULATOR
Filed Aug. 17, 1961

INVENTORS
PAUL M. CUNNINGHAM
ROBERT E. MUHM
BY Moody and Antrim
AGENTS

United States Patent Office 3,080,518
Patented Mar. 5, 1963

3,080,518
CONSTANT MAGNETRON CURRENT REGULATOR
Paul M. Cunningham and Robert E. Muhm, both of Richardson, Tex., assignors to Collins Radio Company, Cedar Rapids, Iowa, a corporation of Iowa
Filed Aug. 17, 1961, Ser. No. 132,090
3 Claims. (Cl. 323—66)

This invention pertains to amplitude control circuits for controlling sources of voltage pulses, and particularly to control circuits that are adaptable to magnetron modulation circuits in that they respond instantly and have correction for frequency variations.

Control circuits have been incorporated in previous systems which utilize means for applying controlled direct-current voltage to pulse-forming circuits or which utilize means for applying controlled alternating-current voltage to various types of pulse-forming circuits. These control circuits are required in order to maintain the peak cathode currents of magnetrons within the rather narrow limits required for their stable operation. Commonly, the input of a pulse voltage control circuit is connected to the output of a pulse-forming circuit so that the control circuit senses the peak voltages which are applied to the magnetron. The control circuit which is responsive to the application of peak voltages may control the voltage of the source, which in some systems may be direct-current and in others, alternating-current, in order to regulate the amplitude of the pulses applied to the magnetron. When the peak voltage sensing means includes an integrating circuit, the control circuit does not respond instantly to changes in pulse voltage for causing instant correction of the voltage amplitude, especially when the duration of each pulse is long compared with each interval between pulses.

The pulse voltage control of this invention is shown applied to a pulse generator which is supplied power from an alternating-current source. The reliability of the circuit is high because only passive components are utilized therein. It responds to variations in current at the input of the pulse-forming network, and therefore does not require an integrating circuit with a long-time constant. The circuit responds instantly to compensate for voltage or frequency changes which are reflected in the amplitude of the pulses being applied to magnetron circuits.

The system to which the present control circuit is applied is the type in which alternating-current voltage is applied to the input of the pulse-forming circuit and in which a pulse generator that controls periodic short-circuiting of the pulse-forming circuit has its frequency synchronized with that of the source of input power. In certain installations of the system, the frequency of the source of voltage may vary substantially. An increase in frequency of the input source which controls the pulse repetition rate is reflected as an increase in the direct-current component of the input current to the pulse-forming network although the peak cathode current of the magnetron is held constant. If frequency compensating circuits were not provided, the control circuit would interpret the increase in frequency as an increase in pulse amplitude and would therefore operate to decrease the amplitude of the pulses below an optimum voltage. The frequency compensating circuit of the present invention cooperates with the amplitude sensing circuit to provide nearly constant peak cathode current for the magnetron.

An object of this invention is to provide fast operating control circuits for regulating peak pulse current independent of substantial variations of input supply voltage.

Another object is to provide frequency-control circuits which cooperate with the amplitude control circuits to provide peak pulse current independent of substantial variations in frequency of the input supply voltage.

And still another object is to obtain reliable operation through the use of passive elements in an economically efficient pulse control circuit.

Figure 2:
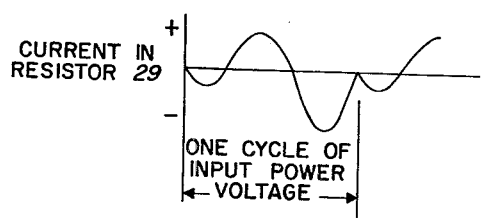
Figure 3:
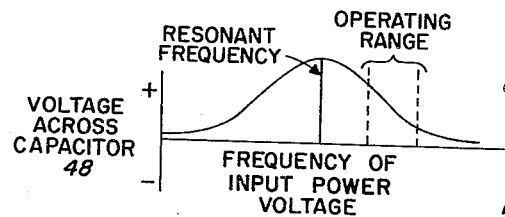

The following description and the appended claims may be more readily understood with reference to the accompanying drawings in which:

FIG. 1 is a schematic diagram of the pulse current control circuit of this invention;

FIG. 2 is a waveform diagram to show variation in voltage at the anode of thyratron tube 26, and the corresponding variation in current through resistor 29 during the formation of a pulse for application to the magnetron; and FIG. 3 shows the variation of voltage across capacitor 48 in response to the variations of frequency of the input source of voltage.

With reference to FIG. 1, pulses of voltage are applied to the cathode of magnetron 11 from pulse-forming circuit 12 to which alternating-current is applied through voltage regulator 13 and transformer 14. The high-voltage pulses are formed in response to the application of pulses from generator 15 which periodically short-circuits the input of the pulse-forming network 12 in synchronism with the frequency of the voltage applied from the source of input power. The amplitude control circuit 17 operates in response to the application of voltage derived from the input current of the pulse-forming network to control the current in the control windings of the saturable voltage regulator 13 and the frequency-control circuit 18 cooperates with the amplitude control circuit 17 to control the current in the control windings of the saturable reactor in response to variation in frequency.

In more detail, the source of power for supplying pulses to magnetron 11 is a source of alternating-current voltage which is connected to terminals 19 and 20. The primary winding of transformer 14 is connected to terminals 19 and 20 through parallel impedance windings 23 and 24 of voltage regulating saturable reactor 13. Diodes 21 and 22 are connected in series with impedance windings 23 and 24 respectively and are connected in opposite senses so that direct current is applied to the windings on alternate half-cycles of the input voltage. The secondary winding of transformer 14 for applying stepped-up voltage is connected to choke coil 25 at the input of the pulse-forming circuit. Voltage is applied through the choke coil to the inductor and capacitor or discharge circuit 12 and the anode of thyratron 26. The output of the pulse-forming circuit is connected to the primary winding of transformer 16 which has bifilar secondary windings connected to cathode 28 of the magnetron 11. Transformer 27 is the usual filament transformer for applying current through the bifilar windings to the filament of the magnetron.

Pulse generator 15 is connected between the current-sensing resistor 29 and the control grid of the thyratron 26 for firing the thyratron in synchronism with the input current. The pulse-forming circuit 12 is a non-resonant type of charging circuit in which the discharge of the network 12 by application of a momentary short circuit in its input forms a sharp high-voltage pulse for application to the cathode of the magnetron. The secondary circuit of transformer 14 for applying voltage to the input of the pulse-forming network also includes resistor 29. The input current of the pulse-forming network 12 flows through the resistor 29 for developing a voltage for application to the input of voltage regulating circuit 17 which is connected across resistor 29.

Resistor 30 connects the resistor 29 to the Zener breakdown diode 33. Capacitor 31 of relatively small capacitance is connected in series with the resistor 30 and the series circuit is connected across resistor 29 to provide filtering with a short-time constant. The capacitance of capacitor 31 is not sufficient to cause any appreciable delay between variation in voltage across resistor 29 and the corresponding variation that is applied to Zener diode 33. The diode 32 that is connected across capacitor 31 is necessary only when the capacitor 31 is the type that must be protected from moderate reverse voltage. The current through resistor 29 which has a waveform according to FIG. 2 has a negative direct-current component which develops a negative voltage across the capacitor 31. This direct-current component is applied to the control windings of the saturable reactor 13 by the circuit which includes serially connected Zener breakdown diode 33, diode 34, control windings 35 and 36 of saturable reactor 13, and resistor 37 which is connected in common with the output of frequency-control circuit 18. When the difference in the voltage which is developed across the resistor 37 in the output of the frequency-control circuit and the voltage across the diode 32 in the output of the voltage control circuit exceeds the breakdown voltage of the Zener diode 33, the diode becomes conductive for causing control current through the windings 35 and 36.

The current through the control or reset windings 35 and 36 opposes the effect of the current flow through the impedance windings 23 and 24 for saturating the magnetic cores of the saturable reactor. An increase in current flow through windings 35 and 36 therefore decreases the time during each half-cycle of the input voltage during which substantial current flows to the transformer 14. Obviously therefore, an increase of current reduces the power to the input of the pulse-forming circuit and reduces the amplitude of the pulses applied to the magnetron 11. The diode 34 prevents reverse current which might result from induction into the control windings 35 and 36.

The frequency-control circuit 18 has means for clipping alternating-current voltages which are supplied from the source of power and means for applying the clipped voltage to a series resonant circuit and a succeeding series rectifier circuit. The series circuit which is connected to the output of the clipper is resonant at a frequency lower than the anticipated lowest frequency of the source of alternating-current voltage. The series rectifier and load circuit are connected across a portion of the series resonant circuit for developing a control voltage that varies inversely with the frequency of the source of input voltage.

More particularly, the terminals 19 and 20 to which the input voltage is applied are connected to the primary winding of isolation transformer 38. The secondary winding of the transformer 38 is connected in parallel with series resistor 39 and capacitor 40 which filter the voltage to provide a smooth sine-wave form. The filtered sine wave developed across the capacitor 40 is applied to a clipping circuit which includes resistor 41 and Zener diodes 42 and 43 which are connected in series across the capacitor 40. The Zener diodes are connected in opposite senses so that the sine wave is transformed to a substantially square wave having constant amplitude. The resonant circuit for developing voltage inversely proportional to the frequency of the source of voltage comprises inductor 44, capacitor 45, and resistor 46 connected in parallel with the serially connected Zener diodes 42 and 43. The series rectifier circuit for developing a direct-current voltage which is applied as a bias to Zener diode 33 includes diode 47, resistor 49, and the resistor 37 connected in series across resistor 46. Capacitor 48 which is connected across the resistors 37 and 39 has sufficient capacitance for filtering the output of the diode 47 but does not have a time constant of such long duration that it interferes with the rapid response of the circuit to change in frequency.

When the frequency of the source of power is constant, the positive voltage at the output of the frequency control 18 is constant for supplying a constant direct-current bias on that terminal of the Zener diode that is connected through the diode 34 to the reset windings of saturable reactor 13. The peak current requirement of the magnetron determines the resistance value of the resistor 29 and the selection of the type of Zener diode. The resistor and the Zener diode have the characteristics required for obtaining breakdown of the diode when the peak cathode current of the magnetron tends to rise above a predetermined optimum value. When the voltage difference between the negative voltage which is derived from the amplitude control circuit and the positive voltage which is derived from the frequency-control circuit exceeds the breakdown voltage of the Zener diode 33, the current flow in the reset windings 35 and 36 of saturable reactor 13 reduces the time of current flow through the impedance windings 23 and 24 during each cycle of voltage applied from the input source. Therefore, the pulse current is reduced as required for maintaining the pulse current substantially constant.

When the voltage applied from the source is constant but the frequency of the source varies, the voltage across resistor 29 also varies and would tend to change the peak current in the cathode circuit of magnetron 11 if a compensating bias voltage were not applied from the frequency-control circuit to the Zener diode 33. For example, when the frequency increases, the voltage across resistor 29 increases so that current flows through the Zener diode 33 a greater amount of the time to cause a reduction in the peak cathode current. However, since the resonant circuit which applies voltage to the rectifier 47 in the frequency-control circuit 18 is resonant at a frequency lower than any operating frequency of the source of power, the positive voltage output which is also applied to the Zener diode decreases with the increase in frequency as shown in FIG. 3 to reduce the bias voltage applied to the Zener diode. The reduction in positive voltage provided by the frequency-control circuit is approximately equal to the increase in negative voltage developed in the amplitude control circuit because of the increase in frequency so that the actual bias across the Zener diode 33 remains substantially constant. Therefore the tendency for the amplitude control circuit to decrease the peak cathode current of magnetron 11 is compensated by the decrease in voltage supplied by the frequency-control circuit.

Although the amplitude control circuit of this invention in combination with the compensating frequency-control circuit has been described with respect to a single application to the pulse-forming circuit for a magnetron, the circuit may be changed in ways obvious to those skilled in the art and still be within the spirit and the scope of the following claims.

We claim:
1. A regulated pulse generator for supplying pulses of constant current independent of frequency and voltage variations of its source of power comprising, a pulse-forming circuit having an output for supplying sharp pulses of current, means including a voltage regulator for applying high voltage to the input of said pulse-forming circuit, said voltage regulator having a control circuit, means for developing a first control voltage proportional to the direct-current component of the current flow in the input circuit of said pulse-forming circuit and for applying said first control voltage above a predetermined value to said control circuit of said voltage regulating means, said voltage regulating means responsive to application of said first control voltage above said predetermined value to vary the voltage applied to the input of said pulse-forming circuit inversely with said control voltage, means for developing a second control voltage proportional to change in repetition rate of pulses developed by said pulse-forming circuit, means for applying said second control voltage to said control circuit in proper sense so that changes therein oppose changes in said first control voltage which result from change in said repetition rate, said voltage regulator being responsive to the application of both said first and second control voltages to maintain the peak current in the output of said pulse-forming circuit constant independent of change in frequency of said repetition rate.

2. A regulated pulse generator for supplying pulses of constant peak current independent of frequency and voltage variations of its source of power comprising, a pulse-forming circuit having an output for supplying sharp pulses of current, a power transformer having a primary winding and a high-voltage secondary winding, a resistor, said secondary winding and said resistor being connected in series across the input of said pulse-forming circuit, a source of alternating-current voltage, a saturable reactor having impedance windings and reset windings, said source being connected through said impedance windings to said primary winding, an amplitude control circuit having an input connected across said resistor, a frequency compensating circuit having its input connected to said source, said reset windings being connected between the output of said amplitude control circuit and the output of said frequency compensating circuit, said amplitude circuit operating in response to the application of direct-current component of voltage to its input above a predetermined voltage for changing the current through said reset windings for increasing the average impedance of said impedance windings, said frequency compensating circuit operating in response to an increase of frequency of said source to develop a voltage which opposes change in the impedance of said impedance windings as a result of that change of voltage at the input of said amplitude control circuit which results from change of frequency rather than from change in amplitude of said source.

3. A peak amplitude control circuit for controlling the peak current output of a pulse-forming circuit comprising, a source of alternating-current voltage, a voltage regulator having a controlled circuit and a controlling circuit, said source being connected through said controlled circuit to the input of said impulse-forming circuit, said pulse-forming input circuit including impedance means for developing a direct-current control voltage proportional to the current in said input circuit, a voltage breakdown device which is substantially conductive during the application thereacross of direct-current voltage above a predetermined voltage, a frequency-control circuit having its input connected to said source of alternating-current voltage, said frequency-control circuit developing a voltage in its output proportional to the change in frequency of said source, said impedance means, said voltage breakdown device, said controlling circuit, and the output of said frequency-control circuit being connected in series, the output of said frequency-control circuit being connected in proper sense so that its voltage output opposes and compensates for change in said direct-current control voltage caused by variation of frequency of said source of alternating-current voltage, said voltage regulator maintaining the peak current in the output of said peak forming circuit constant at a value corresponding to the breakdown voltage of said voltage breakdown device independent of change in frequency of said source of alternating-current voltage.

No references cited.